W. L. WALTON.
POWER PLOW LIFT.
APPLICATION FILED DEC. 24, 1913.
1,310,453.
Patented July 22, 1919.
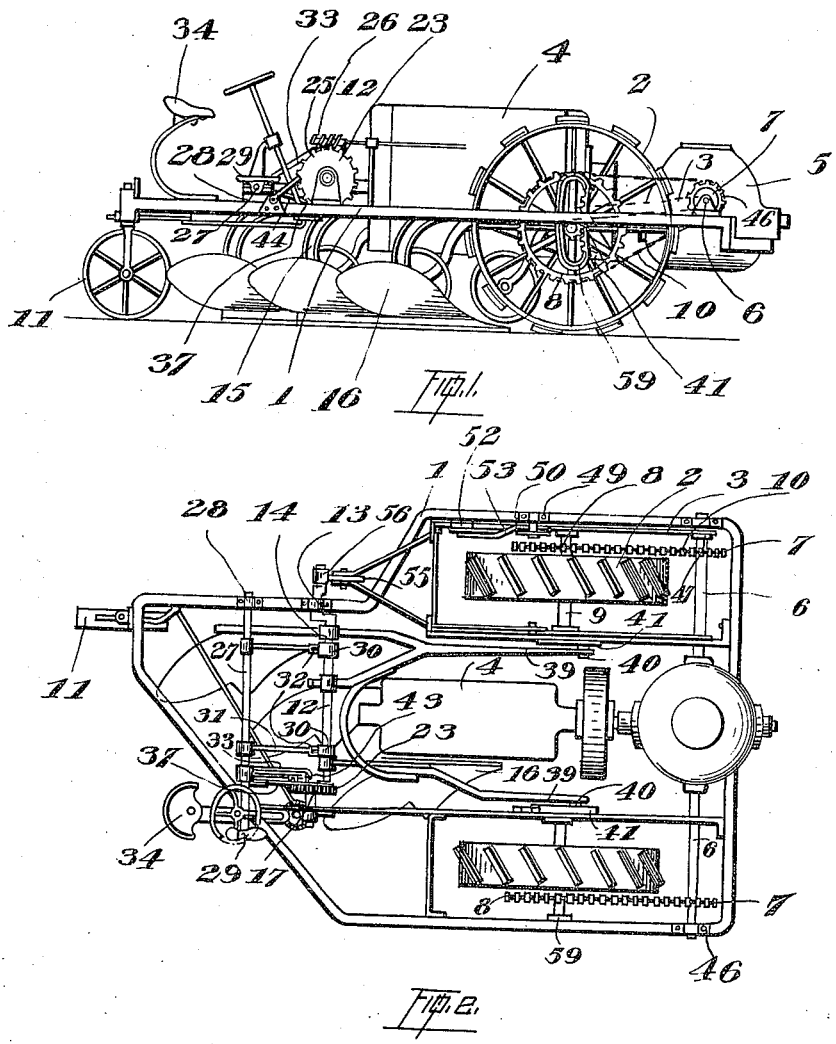
WITNESSES
INVENTOR,
W. L. WALTON.
BY
Fetherstonhaugh & Smart
ATTYS.

UNITED STATES PATENT OFFICE.

WILLIAM L. WALTON, OF BANTRY, NORTH DAKOTA.

POWER-PLOW LIFT.

1,310,453.     Specification of Letters Patent.     Patented July 22, 1919.

Original application filed June 12, 1912, Serial No. 703,239. Divided and this application filed December 24, 1913. Serial No. 808,619.

*To all whom it may concern:*

Be it known that I, WILLIAM L. WALTON, a citizen of the United States of America, and resident of Bantry, in the State of North Dakota, United States of America, have invented certain new and useful Improvements in Power-Plow Lifts, of which the following is the specification.

This invention relates to improvements in power plow lifts and the objects of the invention are generally to simplify and improve the construction of such mechanism, and in particular to cause the plow to enter and leave the ground in the most desirable way which is to cause the plows to cut their way out of the ground and be dipped into the ground with a sweeping movement.

This mechanism is designed to be used with a plow which I have invented, disclosed in my application Serial No. 703,239, patented Dec. 19, 1916, 1,209,084, and in connection with other mechanism described in such application and the other divisional application filed on even date herewith.

It consists of the improved construction hereinafter described in detail in the accompanying specification and drawings.

Figure 1 is a side elevation of the machine.

Fig. 2 is a plan view thereof.

Fig. 3 is a detail showing a side view of the front ends of the plow beam, with rollers arranged to slide in suitable cams.

In the drawings like characters of reference indicate corresponding parts in all the figures.

The general arrangement of the various parts of the plow and lifting mechanism have already been disclosed in my application Serial No. 703,239, filed June 12th, 1912, from which this application has been divided.

In the drawings, 1 represents the main frame having traction wheels 2, one of which traction wheels is journaled in a suitable sub-frame 3. This frame is adapted to be raised and lowered by suitable mechanism, which is set forth in detail and claimed in my application Serial No. 808,620, filed Dec. 24th, 1913.

The frame carries a suitable power plant 4, transmission gear 5, countershaft 6 which latter is suitably connected to the traction wheel axle by the sprocket 8, chain 10 and sprocket 7.

A crank shaft 12 is provided extending transversely across the frame and driven by suitable means. This crank shaft also is pivoted to a clutch 17 by which its movement is controlled, the construction of such clutch being set forth and described in detail in my application Serial No. 808,621. Each of the plows 16 is supported from beams 15 which carry boxes 14 mounted on the crank shaft 12. There are two positions of the crank shaft separated from each other by half a revolution. In one position the plows and cranks are down and in the other up. The crank is rotated by suitable means when desired in a clockwise direction.

In order to turn the plow as it is being raised, and to cause the plow to dip as it is being lowered into the ground with a sweeping movement, the forward end 39 of the plow is provided with a roller 40 which runs in a cam guideway 41 whereby the backward movement of the plow produced by turning the crank shaft 12 will pull the roller up the long incline of the cam raising the points of the shares so that the plow comes out of the ground as is desirable. The top portion of the cam is substantially horizontal, whereby when the crank has traveled backward for its desired distance, the roller will reach the straight portion of the cam which will permit free rearward movement of the plow beam, and so when the plow comes to rest in its upper position, the rollers will be at rest at the top of the inclined part of the cam.

As soon as the plow is required to be let into the ground, the forward movement of the crank 12 will force the rollers down the incline of the cam 41 so that part of the shares will dip down into, and dig the ground very readily, and the action of the forward and downward revolution of the crank will set the plows down with a sweeping movement until finally they are in the ground in operative position.

What I claim as my invention is:

1. In a power gang plow having a motor, a plurality of plow beams having plows thereon, means for supporting the forward end of the plow beam with limited freedom of longitudinal movement, means for raising and lowering the rear end of the plow beams at the end and beginning of a furrow comprising a freely rotatable offset crank shaft, connections between the offset portion of said shaft and the plow beams, and clutch means for rendering said motor operative upon said crank shaft to turn it through half a revolution to lower the plow and to turn it another half revolution to raise the plows whereby the maximum degree of raising and lowering is obtained by the complete revolution of said shaft.

2. In a power gang plow having a motor, a plurality of plow beams having plows thereon, means for supporting the forward end of the plow beams with limited freedom of longitudinal movement comprising a cam guide on either side of the plow forward, the forward ends of said plow beams forming a yoke passing on each side of the motor, and a roller on each arm of the yoke for engaging the cam guide of that side; and means for using the motor for raising and lowering the rear end of said plow beams.

3. In a power plow lift, and in combination, plow lifting mechanism, means tilting the plows as they are being lifted to cause them to cut their way out of the ground, and tilting them in the reverse direction when being lowered.

4. In a power plow lift, and in combination, plow lifting mechanism, means tilting the plows as they are being lifted to cause them to cut their way out of the ground, and means for causing the plows to dip as they are being lowered into the ground with a sweeping movement.

5. In a plow lifting mechanism, the combination with a plow beam, of a plow thereon, means for raising the rear end of the plow beam, and of means for turning the plow in one direction as it is being raised and turning it in the reverse direction as it is being lowered.

6. In a plow lifting mechanism, a plow beam having a plow thereon, means for supporting the forward end of the plow beam with slight freedom of longitudinal movement, a lifting crank operatively connected in the rear part of the plow beam capable of being turned an entire revolution, means for actuating the lifting crank and means for raising the forward end of the plow beam while the beam is drawn rearwardly by the operation of the crank.

7. In a plow lifting mechanism, a plow beam having a plow thereon, means for supporting the forward end of the plow beam with slight freedom of longitudinal movement, a lifting crank operatively connected in the rear part of the plow beam, and capable of being turned through an entire revolution, means for actuating the lifting crank and means for raising the forward end of the plow beam while the beam is drawn rearwardly by the operation of the crank, said means comprising a roller on the plow beam and a cam guiding the roller.

8. In a plow, the combination with the main frame, an engine thereon, traction wheels near the front of the same suitably driven by the engine, and a rear guiding wheel at the rear of the main frame, of plows, a crank shaft extending crosswise of the main frame capable of being turned through an entire revolution and having bearings on the sides thereof, said crank shaft having offset cranks, beams connected to the plows and also suitably connected to the offset cranks of the crank shaft, and means for rotating the crank shafts for lowering and raising the plows into operative and inoperative position, as and for the purpose specified.

9. In a plow lifting mechanism, a plow beam, a plow thereon, means connected to the rear end of the plow beam for moving the same rearwardly and lifting it, and means connected to the forward end of the plow beam for raising it as it is being moved rearwardly and for lowering it as it is being moved forwardly.

10. In a plow lifting mechanism, a plow, a plow beam carrying the same, means connected to the rear end of the plow beam for moving the same forwardly and lowering it, means connected to the forward end of the plow beam for lowering it as it is being moved forwardly.

11. In a plow lifting mechanism, a plow, a plow beam therefor, a crank operatively connected to the rear part of the plow beam and capable of being turned through an entire revolution, a roller on the forward end of the plow beam and a cam guideway formed on opposite ends with horizontally extending parallel portions and an inclined portion connecting the said portions whereby the plow will be tilted as it is being raised and as it is being lowered.

12. In a power plow lift and in combination, a crank shaft support adapted to make a complete revolution, a plow, mechanism connecting the plow to the crank shaft whereby one half of the revolution of the crank shaft lifts the plow and the other half of the revolution lowers the plow, and means for causing the plow to tilt in opposite directions when they are being raised and lowered.

In witness whereof I have hereunto set my hand in the presence of two witnesses.

WILLIAM L. WALTON.

Witnesses:
H. M. WALTON,
NELS MELOOS.

Copies of this patent may be obtained for five cents each, by addressing the "Commissioner of Patents, Washington, D. C."